3,834,915
FINE GRAIN TRANSLUCENT ALUMINA
Joseph J. Cleveland, Wysox, and Carl W. Fritsch, Jr., Dushore, Pa., assignors to GTE Sylvania Incorporated
No Drawing. Filed July 24, 1972, Ser. No. 274,240
Int. Cl. C04b 35/10; H01j 61/30
U.S. Cl. 106—73.4
3 Claims

ABSTRACT OF THE DISCLOSURE

A translucent alumina composition exhibiting color stability, a high degree of light transmission, thermal shock resistance and a relatively fine grain size is disclosed. The composition consists essentially of from about 99.8 to about 99.95% aluminum oxide, from about 0.025 to about 0.10% magnesium oxide and from about 0.025 to about 0.10% ytterbium oxide. An improvement to the process for making translucent alumina is also disclosed. By adding from about 0.025 to about 0.1% of ytterbium oxide, the firing temperature of the composite in hydrogen can be lowered appreciably to the range of from about 1620° C. to about 1680° C. and results in an average grain size of about 10 microns. The foregoing translucent alumina composition when formed in tubular shapes is particularly suited for arc discharge lamps.

BACKGROUND OF THE INVENTION

Field of the Invention

This invention relates to translucent alumina having high light transmission characteristics. More particularly, it relates to translucent alumina for use in lamps.

Prior Art

Aluminum oxide ceramics are used in a variety of industrial uses. The use depends upon the physical properties of the ceramic after firing which are dependent to a large degree upon the aluminum oxide content of the ceramics and the firing conditions. U.S. Pat. 3,026,210 discloses a high density polycrystalline body capable of transmitting light which incorporates magnesia and is produced at the high firing temperatures of from 1800° C. to 1950° C. These temperatures were required to achieve the desired degree of transparency. Grain growth is retarded by the use of magnesia. Such ceramics are generally referred to as translucent or transparent polycrystalline alumina.

Compositions chemically similar but not physically similar to those used for translucent uses can also be used for cutting tools and the like except, however, to achieve suitable mechanical strength the compositions are fired at lower temperatures. The grain size of such materials is generally considerably below 10 microns. U.S. Pat. 3,377,176 discloses a process for making such materials and that a variety of oxides can be used as grain growth inhibitors in addition to magnesia. Other oxides mentioned are oxides of chromium, nickel, titanium, cerium, vanadium, and the rare earth metals. Specifically preferred in that patent is a combination of yttrium oxide and magnesium oxide. These materials are fired at temperatures of from 1450° C. to 1550° C. in air to achieve an alumina having a crystal size of below 3 microns. Such materials, however, while satisfactory for cutting tools, spark plugs, insulators, nozzles and other uses where abrasion resistance is important, would not have the desired degree of transparency required for uses in lamps.

In the lamp field, in addition to having a high degree of transparency or translucency, the polycrystalline alumina must have other characteristics, for example, it must be capable of withstanding high temperatures without physical or chemical deterioration. Additionally, since often the translucent parts are alternately cooled and heated rather rapidly to operating temperatures, the alumina must be resistant to thermal shock.

It is believed, therefore, that a translucent polycrystalline alumina composition exhibiting a high degree of light transmission, which will withstand high temperatures in an operating atmosphere without chemical deterioration and is highly resistant to thermal shock is an advancement in the art. It is further believed, that a process which can be conducted at reduced firing temperatures and still achieve the desired properties in a translucent polycrystalline alumina ceramic is also an advancement in the art.

OBJECTS AND SUMMARY OF THE INVENTION

It is an object of this invention to provide a polycrystalline alumina ceramic having light transmission capability.

It is a further object of this invention to provide a translucent polycrystalline alumina ceramic having a relatively small grain size and a high resistance to thermal shock.

It is another object of this invention to provide a process capable of producing a translucent polycrystalline ceramic at significantly reduced firing temperatures.

It is still a further object of this invention to provide a translucent polycrystalline ceramic which does not exhibit discoloration even upon prolonged heating in air at elevated temperatures.

These and other objects are achieved in one aspect of this invention wherein an improved polycrystalline alumina ceramic consisting essentially of from about 99.8 to about 99.95% by weight of aluminum oxide, from about 0.025 to about 0.10% by weight of magnesium oxide and from about 0.025 to about 0.10% by weight of ytterbium oxide is produced by an improved process that enables the translucent ceramics to be produced at a reduced firing temperature of from about 1620° C. to about 1680° C.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

The oxides used in the production of the translucent polycrystalline ceramic are relatively high purity, that is, having a purity of at least about 99.9% of the corresponding oxide, namely aluminum oxide, magnesium oxide and ytterbium oxide. Additionally, care must be exercised throughout the processing to avoid any contamination or any contaminants that are not volatized at temperatures of below 600° C. These oxides are used in the foregoing levels of from about 99.8 to about 99.95% by weight of aluminum oxide, from about 0.025 to about 0.10% by weight of each of magnesium oxide and ytterbium oxide with from about 0.05 to about 0.70% by weight being preferred. These oxides in the foregoing weight percentages are mixed with from about 0.5 to 3.0% by weight and preferably about 1% of a binder such as aluminum hydroxide or sub-micron size high purity aluminum oxide. The purpose of the binder is to hold the individual oxide particles together during the subsequent sintering and firing steps. Preferably from about .5 to 3.0 parts of a dispersant or deflocculant such as ammonium polycarboxylates such as ammonium polyacrylate or an equivalent volatile deflocculant is also added. Although ammonium polyacrylate is preferred, any deflocculant can be used which will prevent flocculation at essentially neutral pH and will be volatized below 600° C. The deflocculant is mixed with the foregoing blend of oxides and binder and from about 1 to about 3 parts of water per part of solids. These materials are milled for about 24 hours in a non-contaminating ball mill such as a plastic or a plastic-coated ball mill and the grinding media or balls are non-contaminating. The resulting blend is wet screened through a 400 U.S. Standard mesh screen. The undersize is thereafter dried using hot air at about 200 to 300° C., to remove water. The dried powder is screened to obtain —40 to +100 fraction. The fraction is isostatically pressed using from 8,000 to 33,000 pounds per square inch to yield a shaped article having a density of about 40% of theoretical. The shaped article is presintered in air at from about 1000° C. to 1300° C. for at least about 2 hours to enable the shaped article to be machined to the desired size. After machining the material is sintered in hydrogen at from about 1620° C. to 1680° C. for about 4 hours. Prior processes disclosed firing at from about 1700° C. to about 1950° C. to achieve suitable light transmission such as about 93% as measured by using an integrating sphere. Grain size is measured as mean grain diameter using method described by R. L. Fullman in *Ceramic Microstructures*, edited by Richard M. Fulrath and Joseph A. Pask, page 735, John Wiley and Sons, New York, 1966 and have a grain size of from about 5 to 15 microns with an average size below 10 microns. By the practice of the process of this invention, translucent materials having at least 93% and even higher such as 97% are produced. The compositions of this invention have an improved thermal shock resistance as measured by placing tube in a 4½" x ¾" x ⅜" silicon nitride resistance (1,800 to 2,200 micro-ohm-centimeters) bar with a 7/16 inch diameter hole for the alumina ⅜ inch diameter tube. A variable current is passed through the resistance bar to heat the tube from room temperature at a rate of 10° C./second. The temperature at which the tube cracks is listed as the thermal shock temperature.

The translucent polycrystalline alumina compositions of this invention exhibit essentially no discoloration upon being heated in air at elevated temperatures for prolonged periods of time. Other translucent polycrystalline alumina compositions, produced by essentially the same procedure without ytterbium oxide and those containing yttrium, europium or samarium oxide at the same levels as ytterbium oxide as in this invention discolored under similar conditions of temperature and time. For example, tubes of high purity alumina with .05% additions of MgO and $Y_2O_3$ were heated in air at about 1000° C. for about 12 hours. Readings were taken before and after the heat treatment and in every case the tubes which contained .05% $Y_2O_3$ dropped approximately 5% in transmission. Tubes of high purity alumina with .05% MgO and a .05% addition of $Yb_2O_3$ replacing $Y_2O_3$ showed no loss in transmission after the above test and the grain size in the fine grained alumina tube maintained the characteristics of small even grains that the tubes had with $Y_2O_3$.

The polycrystalline alumina compositions can be used in any application where the properties of initial high light transmission, temperature stability in regard to chemical, mechanical and light transmission properties, and a resistance to thermal shock are required. One primary usage is the inner tubular member of an arc discharge lamp. These lamps in addition to their arc electrode contain a chemically active metal as a light emitting constituent and operate at high temperatures. Furthermore, the lamps are very efficient as they emit high levels of light per unit of power input. The lamps are employed where a large light output is required, e.g., outdoor lighting for parking lots, street lighting, shopping centers, warehouse lighting and the like.

To more fully illustrate the invention, the following examples are presented. All parts, proportions and percentages are by weight unless otherwise indicated.

EXAMPLE I

About 600 parts of high purity alumina, about 0.3 parts of high purity magnesium oxide, about 0.3 parts of high purity ytterbium oxide, about 6 parts of aluminum hydroxide and about 6 parts of ammonium polyacrylate are charged into a plastic ball mill having high purity alumnia balls. About 1200 parts of deionized water is added and the materials are milled for about 48 hours. The wet, milled material is screened through a 400 mesh U.S. Standard Sieve screen and the material passing through the screen is dried at about 240° C. for about 16 hours. The dried material is screened through a U.S. Standard Sieve screen and the material passing through a 40 mesh screen and retained on a 100 mesh screen is further processed. This desired fraction, about 60% of the raw materials initially charged, is isostatically pressed, using about 33,000 pounds per square inch pressure, into a tubular shape. The pressed tube is presintered at about 1200° C. for about 4 hours and thereafter machined to the desired size. The machined tube is heated in a hydrogen atmosphere at a temperature of about 1660° C. for about 4 hours.

Analytical tests on the material show that the tubes meet the following specifications:

1. Grain Size—5 to 15 microns
2. Transmission
   a. 94–97% using integrating sphere method
3. Not acceptable if there are cracks, chipped edges, foreign inclusions, or any other obvious defects with maximum dimension larger than .003".

EXAMPLE II

A translucent tube is made according to Example I and compared with 5 commercially alumina available tubes from 4 different manufacturers which did not contain ytterbium oxide. Comparison data are given in the table below. Sample 1 is the translucent tube made in accordance with Example I and Eamples 2–6 are the commercial available tubes. The following table gives the results of comparative tests.

| | Thermal shock, ° C. (silicon nitride resistance bar) | Grain size (average) line intercept, μm | Transmission (integrating sphere with 2½% correction) |
|---|---|---|---|
| Sample: | | | |
| 1 | 1,200–1,300 | 10.0 | 93.0–94.0 |
| 2 | 1,100 | 22.3 | 92.4 |
| 3 | 1,050 | 20.0 | 89.6 |
| 4 | 1,050 | 57.4 | 93.1 |
| 5 | 1,050 | 53.0 | 93.2 |
| 6 | 1,175 | ¹ 35.0 | 92.7 |

¹ Non-uniform.

While there has been shown and described what are at present considered the preferred embodiments of the invention, it will be obvious to those skilled in the art that various changes and modifications may be made therein without departing from the scope of the invention as defined by the appended claims.

What is claimed is:

1. A translucent alumina composition consisting essentially of from about 99.8 to about 99.95% by weight of aluminum oxide, from about 0.025% to about 0.10% by weight of magnesium oxide and from about 0.025 to about 0.10% by weight of ytterbium oxide, said composition having an average grain size of below about 10 microns, exhibiting a resistance to thermal shock when heated from about room temperature to about 1200° C.

at the rate of 10° C./second and exhibiting no loss in light transmission or grain growth when heated *in air* at about 1,000° C. for about 12 hours.

2. A composition according to Claim 1 wherein said composition contains from about 0.05 to about 0.70% by weight of ytterbium oxide.

3. A composition according to Claim 2 wherein said composition contains from about 0.05 to about 0.70% by weight of magnesium oxide.

References Cited

UNITED STATES PATENTS

| 3,377,176 | 4/1968 | Wolkodoff | 106—46 |
| 3,711,585 | 1/1973 | Muta et al. | 106—65 X |
| 3,311,482 | 3/1967 | Klingler et al. | 106—46 |
| 3,291,747 | 12/1966 | Lefever et al. | 252—301.4 R |

HELEN M. McCARTHY, Primary Examiner

U.S. Cl. X.R.

106—65; 220—2.1; 264—65

UNITED STATES PATENT OFFICE
CERTIFICATE OF CORRECTION

Patent No. 3,834,915                    Dated September 10, 1974

Inventor(s) Joseph J. Cleveland and Carl W. Fritsch, Jr.

It is certified that error appears in the above-identified patent and that said Letters Patent are hereby corrected as shown below:

Col. 2, line 58 - "0.70%" should read -- 0.07% --

Col. 5, line 5  - "0.70%" should read -- 0.07% --

Col. 5, line 8  - "0.70%" should read -- 0.07% --

Signed and sealed this 19th day of November 1974.

(SEAL)
Attest:

McCOY M. GIBSON JR.                C. MARSHALL DANN
Attesting Officer                  Commissioner of Patents